Feb. 18, 1969          R. E. GOTTSCHALK          3,428,398
VARIABLE ANAMORPHIC LENS SYSTEM
Filed June 1, 1965
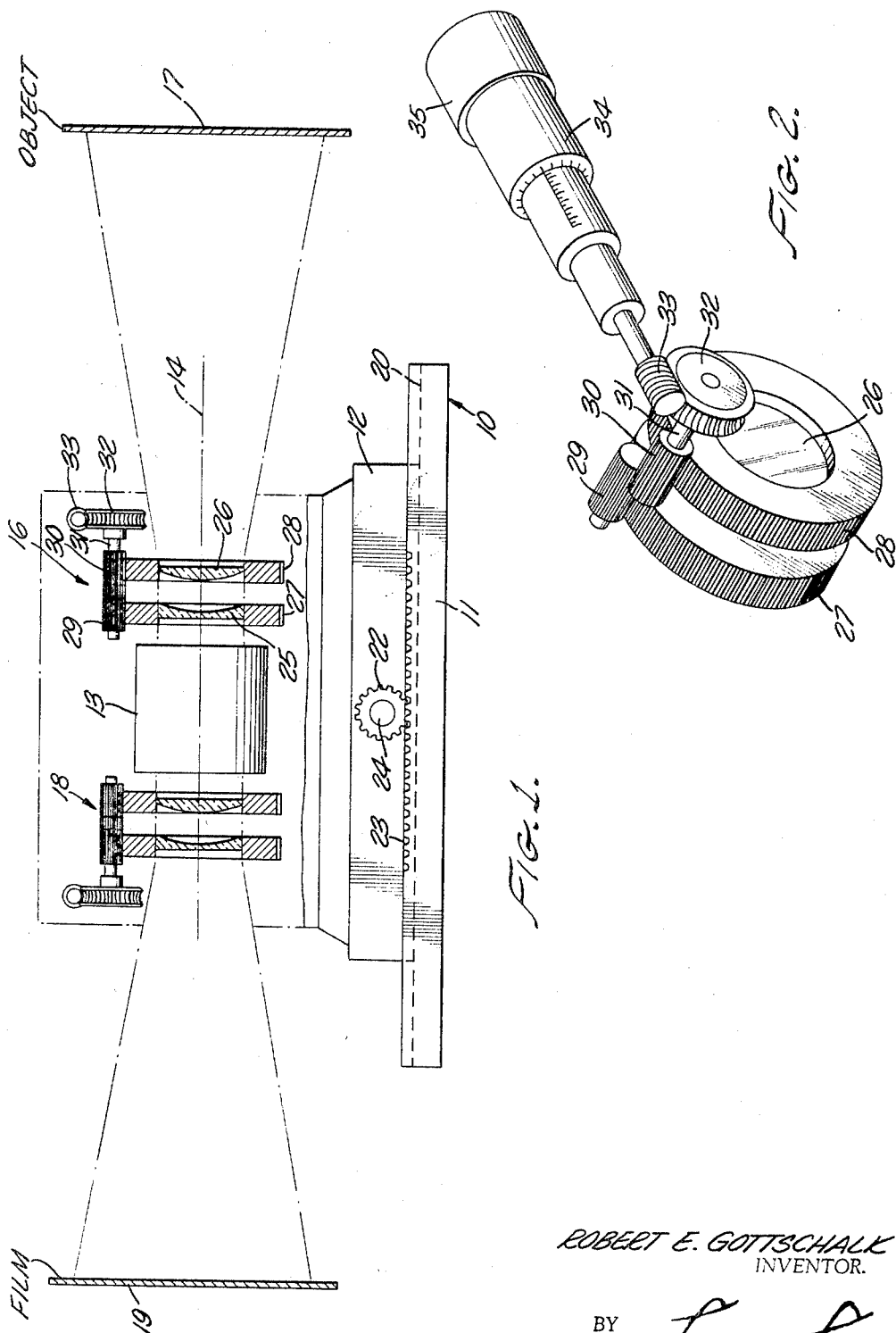
ROBERT E. GOTTSCHALK
INVENTOR.
BY *Lyon & Lyon*
ATTORNEYS

3,428,398
VARIABLE ANAMORPHIC LENS SYSTEM
Robert E. Gottschalk, Los Angeles, Calif., assignor to Panavision Incorporated, Los Angeles, Calif., a corporation of California
Filed June 1, 1965, Ser. No. 460,151
U.S. Cl. 355—52
Int. Cl. G03b 27/68
2 Claims

ABSTRACT OF THE DISCLOSURE

Two identical pairs of counter-rotating cylindrical lenses are mounted co-axially upon a carrier on opposite sides of a fixed focus spherical lens, each pair comprising a positive lens and a negative lens constrained to turn equally in opposite directions about the common optical axis, so that the width-to-height ratio of the image may be varied.

---

This invention relates to anamorphic lens systems. The invention will be described in connection with a camera of the type used for photoengraving work, although this is by way of illustration and not of limitation.

Cameras employed in photoengraving work are used to provide the exposed photographic film which is used as the first step in the photoengraving process. The length and width dimensions of the exposed portion of the photographic film must be maintained within very close limits, and this is true even when the camera is employed to reduce or to enlarge the object being photographed. Such object may comprise a photograph, chart, drawing, printed matter, etc., or combinations of these.

Prior to this invention, it has not been possible to vary the width-to-height ratio of the exposed area on the film, even to a small degree. Accordingly, when the object being photographed did not produce the exact width and height requirements on the exposed area of the film, it has been necessary to prepare a new photograph, chart, drawing, printed matter, etc., to be photographed, often at considerable expense and delay.

Accordingly, it is an important object of this invention to provide an anamorphic lens system for use in a photoengraving camera which will permit changes in the width-to-height ratio on the exposed area of the photographic film in order to meet both width and height requirements. Other and more detailed objects and advantages will appear hereinafter.

In the drawings:

FIGURE 1 is a side elevation in diagrammatic form, showing a preferred embodiment of this invention.

FIGURE 2 is a perspective view, showing one of the pairs of counter-rotating cylindrical lens assemblies.

Referring to the drawings, a camera assembly generally designated 10 includes a stationary base 11 having a mount or carrier 12 slidably supported thereon. A prime lens 13, which is a fixed-focus spherical lens having a principal axis 14, is mounted on the carrier 12 in a conventional manner. A lens assembly 16 comprising a pair of counter-rotating cylindrical lenses is mounted on the carrier 12 between the prime lens 13 and the object 17 to be photographed. A lens assembly 18 comprising a pair of counter-rotating cylindrical lenses is mounted on the carrier 12 between the prime lens 13 and the plane of the photographic film 19. Guideways 20 on the stationary base 11 guide the carrier 12 for movement parallel to the lens axis 14, and the lens assemblies 16 and 18 are aligned with this axis 14. Means are provided for adjustably moving the carrier 12 along the base 11, and as shown in the drawings this means may include a pinion gear 22 mounted to turn on the carrier 12 and meshing with a stationary rack 23 provided on the base 11. A knob 24 may be provided for turning the pinion 22.

The lens assemblies 16 and 18 are duplicates, and each is of the general type as shown in the Wallin Patent 2,890,622, granted June 16, 1959. Each assembly includes a negative cylindrical lens 25 and a positive cylindrical lens 26 mounted for rotation about the common axis 14. Means are provided for rotating the lenses 25 and 26 of each pair equally in opposite directions about the common axis, and as shown in FIGURE 2 this means includes a spur gear 27 encircling the lens 25 and a spur gear 28 encircling the lens 26. The spur gear 27 is engaged by a pinion gear 29, and the spur gear 28 is engaged by a pinion gear 30. Each of the pinion gears is rotatably supported on the carrier 12. The pinion gears 29 and 30 are in mesh with each other. Accordingly, turning movement of the pinion 30 in a clockwise direction as viewed in FIGURE 2 results in turning movement of the lens 26 in a counterclockwise direction and turning movement of the lens 25 in a clockwise direction. Since the pinion gears 29 and 30 are duplicates and since the spur gears 27 and 28 are duplicates, the lenses 25 and 26 are turned equally in opposite directions.

Means are provided for rotating the pinion 30, and as shown in the drawings this means includes a worm wheel 32 fixed to the shaft 31 of the pinion 30 and engaged by the worm pinion 33 carried on the adjusting screw device 34. The device 34 is mounted on the carrier 12 and is provided with a manually graspable knob 35 which is connected to turn the worm pinion 33.

In a typical example, the prime lens 13 was a standard 19″ focal-length lens of about 2½″ in diameter and of the type commonly used in cameras for photoengraving work. The pairs of counter-rotating cylindrical lenses used in the lens assemblies 16 and 18 each had a power of 0.65 diopter, and were about the same diameter as the prime lens. With this arrangement, variation in the length or width of the exposed area on the film 19 could be accomplished up to a value of about eight percent, while holding the other dimension constant.

The camera shutter mechanism is conventional and is omitted from the drawings.

When no change in the aspect ratio is desired from the worksheet 17 to the exposed area of the film 19, the lens assemblies 16 and 18 are each adjusted so that the lens system does not produce any anamorphic effect. In this position, the axes of curvature of the pairs of lenses are in the same plane. When it is desired to change the aspect ratio, in order to change the length relative to width of the exposed area of the film 19, the adjusting screw 35 for the lens assembly 18 is turned to produce the ratio required. The adjusting screw 35 for the lens assembly 16 is then turned to sharpen the image on the film plane, and at the same time the entire carrier 12 is shifted along the base 11 by means of the knob 24 to produce the required over-all size. These adjustments may be repeated to sharpen the image.

Having fully described my invention, it is to be understood that I do not wish to be limited to the details herein set forth or to the details illustrated in the drawings, but my invention is of the full scope of the appended claims.

I claim:

1. In an anamorphic lens system, the combination of: a fixed focus spherical lens having a principal axis; a carrier supporting said lens, two identical pairs of counter-rotating cylindrical lenses mounted on the carrier in alignment with said axis, each pair comprising a positive lens and a negative lens having power of equal magnitude, one of said pairs being positioned in front of said spherical lens and the other of said pairs being positioned behind it, and means whereby the lenses of each pair may be turned equally in opposite directions about said principal axis from a position in which the axes of curvature of all of the cylindrical lenses lie in a common plane containing said axis.

2. In a camera for exposing a film from a worksheet, the combination of: a fixed focus spherical lens having a principal axis, a carrier supporting said lens and positioned between the worksheet and the film, adjustable means for moving the carrier longitudinally of said axis, two identical pairs of counter-rotating cylindrical lenses mounted on said carrier in alignment with said axis, each pair comprising a positive lens and a negative lens having power of equal magnitude, one of said pairs being positioned between said spherical lens and the worksheet, and the other of said pairs being positioned between the spherical lens and the film, and means for turning the lenses of each pair equally in opposite directions about said principal axis from a position in which the axes of curvature of all of the cylindrical lenses lie in a common plane containing said axis.

References Cited

UNITED STATES PATENTS

| 886,770 | 5/1908 | De Zeng | 350—181 |
| 2,121,567 | 6/1938 | Newcomer | 350—181 |
| 2,890,622 | 6/1959 | Wallin | 350—182 |

DAVID SCHONBERG, *Primary Examiner.*

RONALD J. STERN, *Assistant Examiner.*

U.S. Cl. X.R.

95—4.5; 350—181